May 5, 1970 E. R. ANDERSON ET AL 3,509,983
POCKET DISCHARGE ARTICLE BY ARTICLE FEED
Filed Jan. 29, 1968 6 Sheets-Sheet 1

INVENTORS.
EARL R. ANDERSON
CLIFFORD E. KEESLING
BY
ATTORNEYS

INVENTORS.
EARL R. ANDERSON
CLIFFORD E. KEESLING
BY
ATTORNEYS

United States Patent Office 3,509,983
Patented May 5, 1970

1

3,509,983
POCKET DISCHARGE ARTICLE BY
ARTICLE FEED
Earl R. Anderson and Clifford E. Keesling, Los Gatos,
Calif., assignors, by mesne assignments, to Brex Corporation, Los Gatos, Calif., a corporation of Nevada
Filed Jan. 29, 1968, Ser. No. 701,423
Int. Cl. B65g 47/78, 47/24
U.S. Cl. 198—26                              10 Claims

ABSTRACT OF THE DISCLOSURE

An article by article feeder for handling field run of fruit and vegetable articles such as pears, peaches, onions and the like, as an abutting file, having a trough which is mounted for movement between a lower position in which an article feed occurs to place the endmost article against a stop and having an upper position for removal of such article. A pocket means is mounted for movement with respect to the trough for engaging and lifting said endmost article from the trough and for carrying it bodily to an outboard position for discharge. The trough and the pocket means include a slotted construction of each to enable movement to and from telescoped relation to insure engagement of the pocket means below the endmost article in the trough for the lifting and removal operation. An orienter for articles such as pears is provided for receiving a discharged pear and for aligning the pear with its axis in a given position and for effecting end-over-end positioning of pears which are positioned in the orienter with the stem end out of position after the orientation alignment thereof.

Description of the invention

In the handling of a field run of fruit articles such as pears, for example, it is necessary to handle various size ranges. A field run of pears will vary approximately from 2½" diameter to 3½" diameter at the bulb end, apples from 1" to 5", cling peaches from 2" to 4" and apricots from 1" to 2". To insure effective separation of the endmost article by means of the pocket means of the apparatus it is desirable that an inclined lifting and separating or stripping element be included in the pocket means which will have its inboard edge to the right of the center of gravity of each article to be lifted, so that they can be effectively lifted from a support or trough while restraining the next adjacent article. At the same time the construction must be such that the stripping element is positioned beneath the fruit article, such as a pear, without rubbing action so as to not injure the fruit.

In accordance with the instant invention therefor a trough and a pocket means are mounted for relative vertical movement with respect to each other and for relative in or out movement with respect to each other at the discharge end of the trough to relatively telescope these components which are slotted or have complementary interleaving construction so as to enable the movement of the pocket into position for engagement with an article, while it is wholly supported by the trough.

It is accordingly a general object of the invention to provide an improved article-by-article feed in which a trough or support for handling an abutting file of field run of articles and a pocket means are mounted for telescoping engagement with respect to each other to place the pocket means freely in position underneath an article to be lifted and subsequently discharged therefrom.

A further object of the invention is to provide such a pocket means and a trough in which the relative movement in a vertical direction and the relative movement in a horizontal direction are so timed with respect to each other as to accomplish the lifting of the endmost article from a file in the trough by the pocket means and bodily removing the article from the trough and placing it in an outboard position with respect to the trough for discharge into a cooperating mechanism such as an orienter.

A still further object of the invention is to provide a pocket means which is composed of two pocket members which are mounted for movement with respect to each other in closing and opening so as to effectively provide for engagement beneath an article to lift it and to effectively provide for discharging the article downwardly by opening the bottom of the pocket.

It is still another object of the invention to provide an article by article feed in a trough wherein there is no possibility of injury to the articles as they roll or progress down the trough against a stop.

Other objects and advantages of the invention will be apparent from the following description of a preferred embodiment thereof, made in connection with the accompanying drawings, in which.

Figure 1:
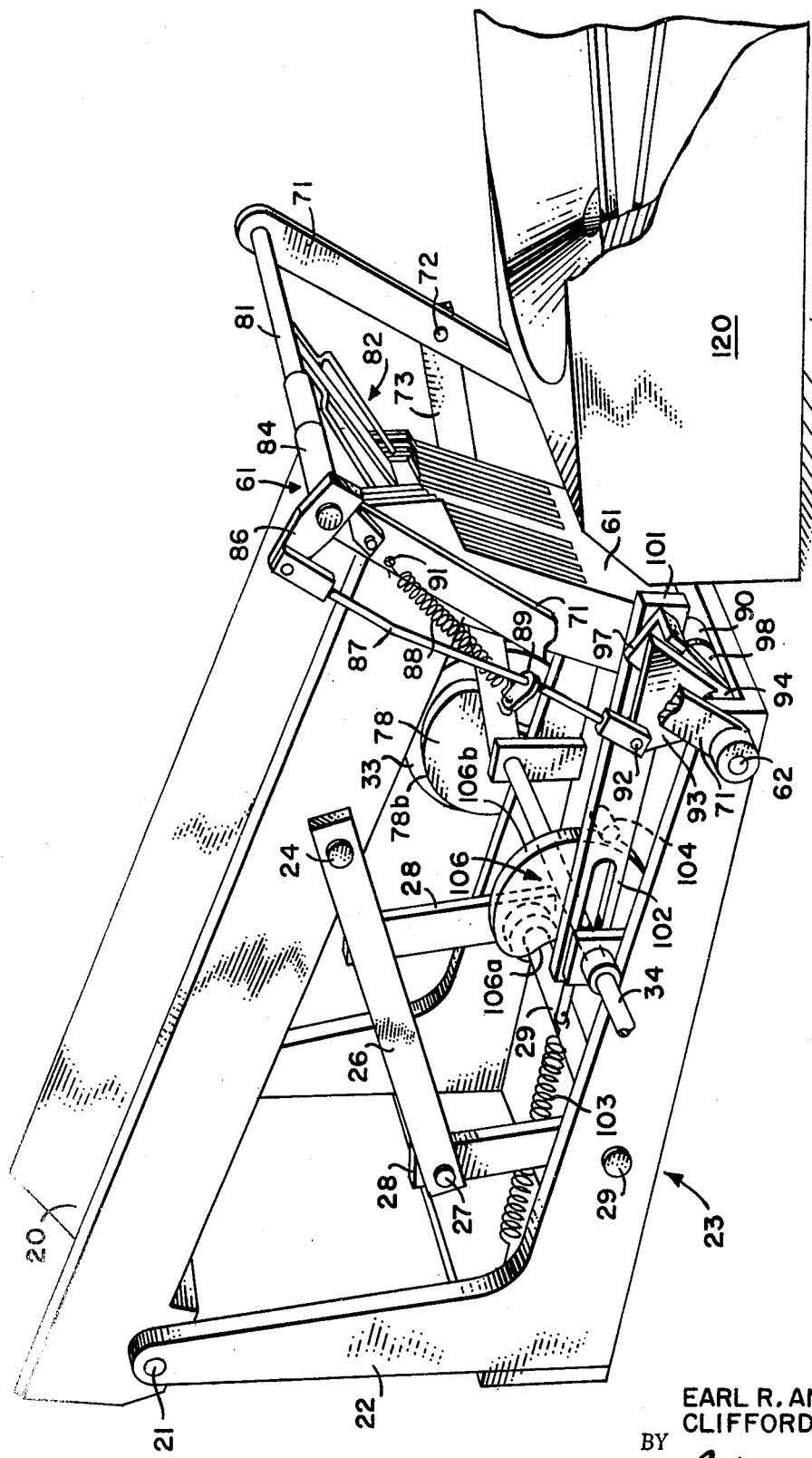
FIG. 1 is a perspective view of an article by article feeder embodying the present invention and in cooperative relation to an orienter for articles such as pears.
Figure 2:
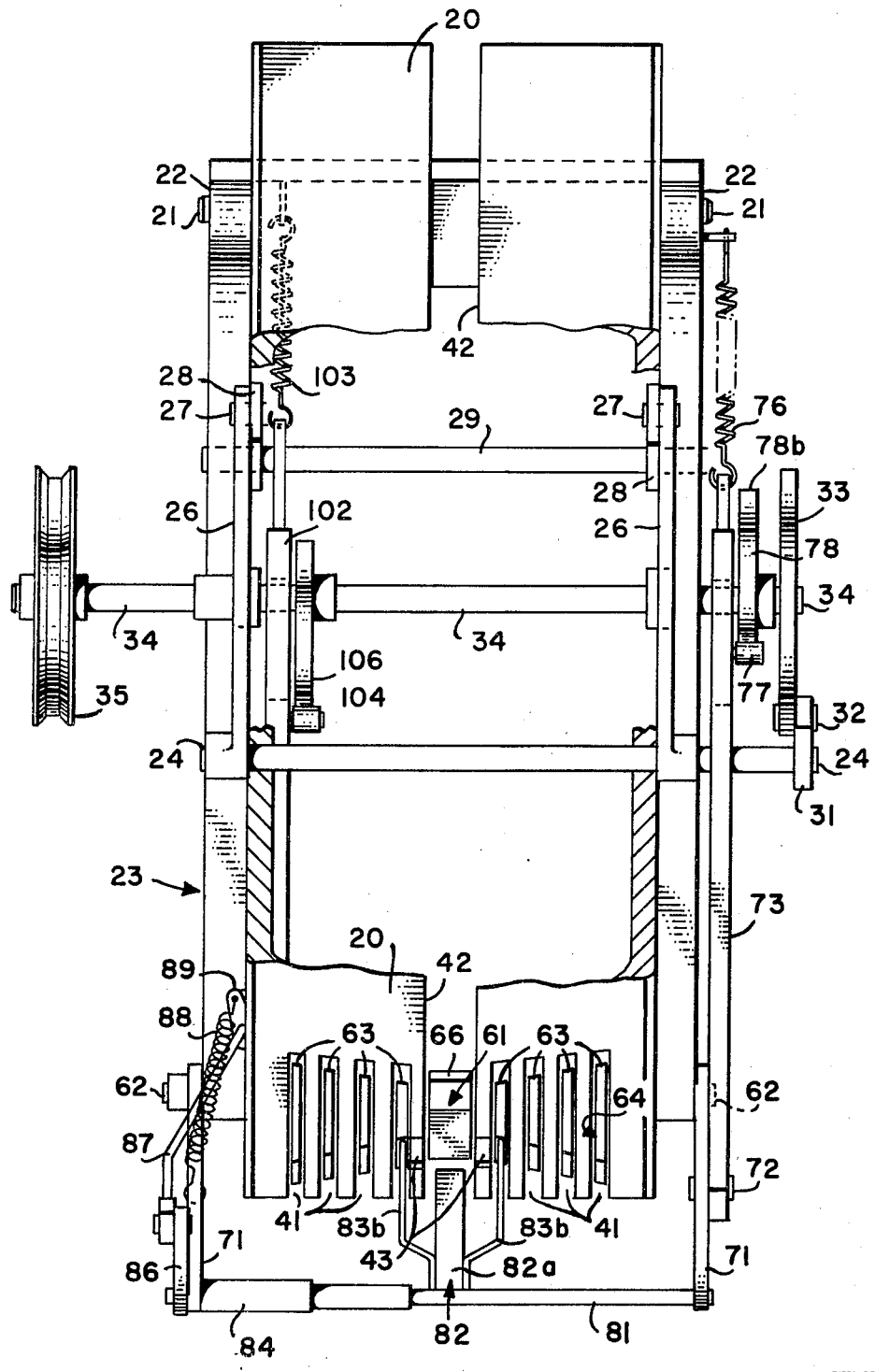
FIG. 2 is a plan view of the article by article feeder shown in FIG. 1.

Referring to FIGS. 1-4 the feeder includes a trough 20 which is pivotally mounted at 21 adjacent its discharge end on a pair of upright portions 22 of a frame 23. The opposite side walls of the trough 20 have a V-shaped disposition and include an angle of approximately 112.5°. Intermediate its ends the bottom position of the trough is engaged by a through shaft 24 which is engaged pivotally at its opposite ends by the upper ends of a pair of parallel links 26, which, at their lower ends, are pivotally connected by pivot pins 27 with a pair of upright links 28 pivotally mounted on a cross shaft 29. The linkage 26–28 provides a stabilizing linkage for the trough. One end of the shaft 24 (FIG. 3) is pivotally engaged by an operating link 31 which, at its lower end, pivotally engages a drive pin 32 carried by a disk 33 secured on a main operating shaft 34 suitably journaled in the respective sides of the frame 23. The shaft 34 (FIGS. 2 and 4) carries a drive pulley 35. The discharge end of the trough therefore will be oscillated or reciprocated vertically once during each revolution of the shaft 34. The trough is at an angle of about 30° to the horizontal in its lower position for effective feeding of the fruit down the trough, and when the discharge end is in its upper position the trough is disposed at a suitable angle for pick up of fruit, such as about 10°.

Figure 3:
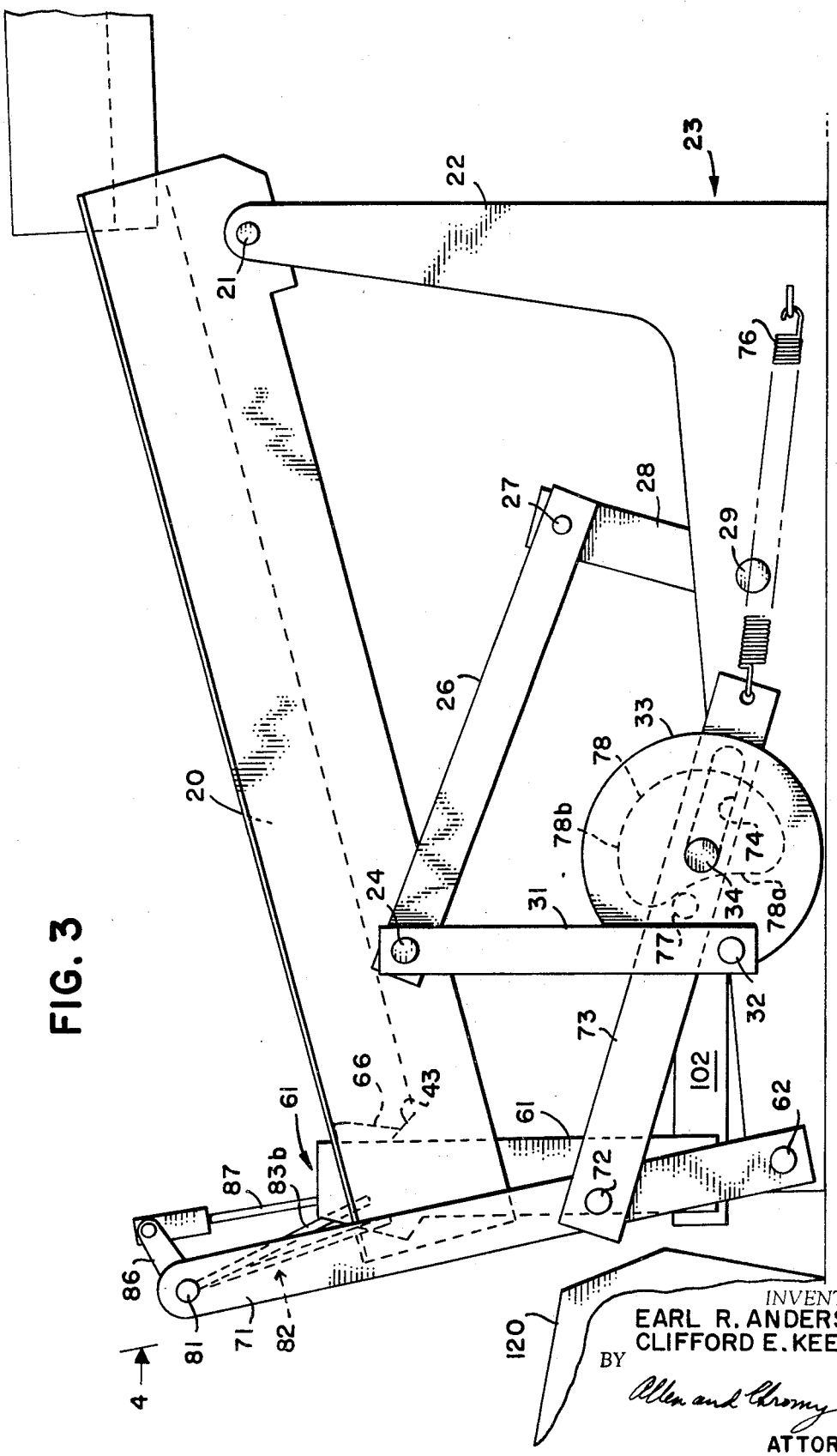
FIG. 3 is a side elevational view of the article feeder and the orienter as seen from the opposite side of the perspective view of FIG. 1.
Figure 4:
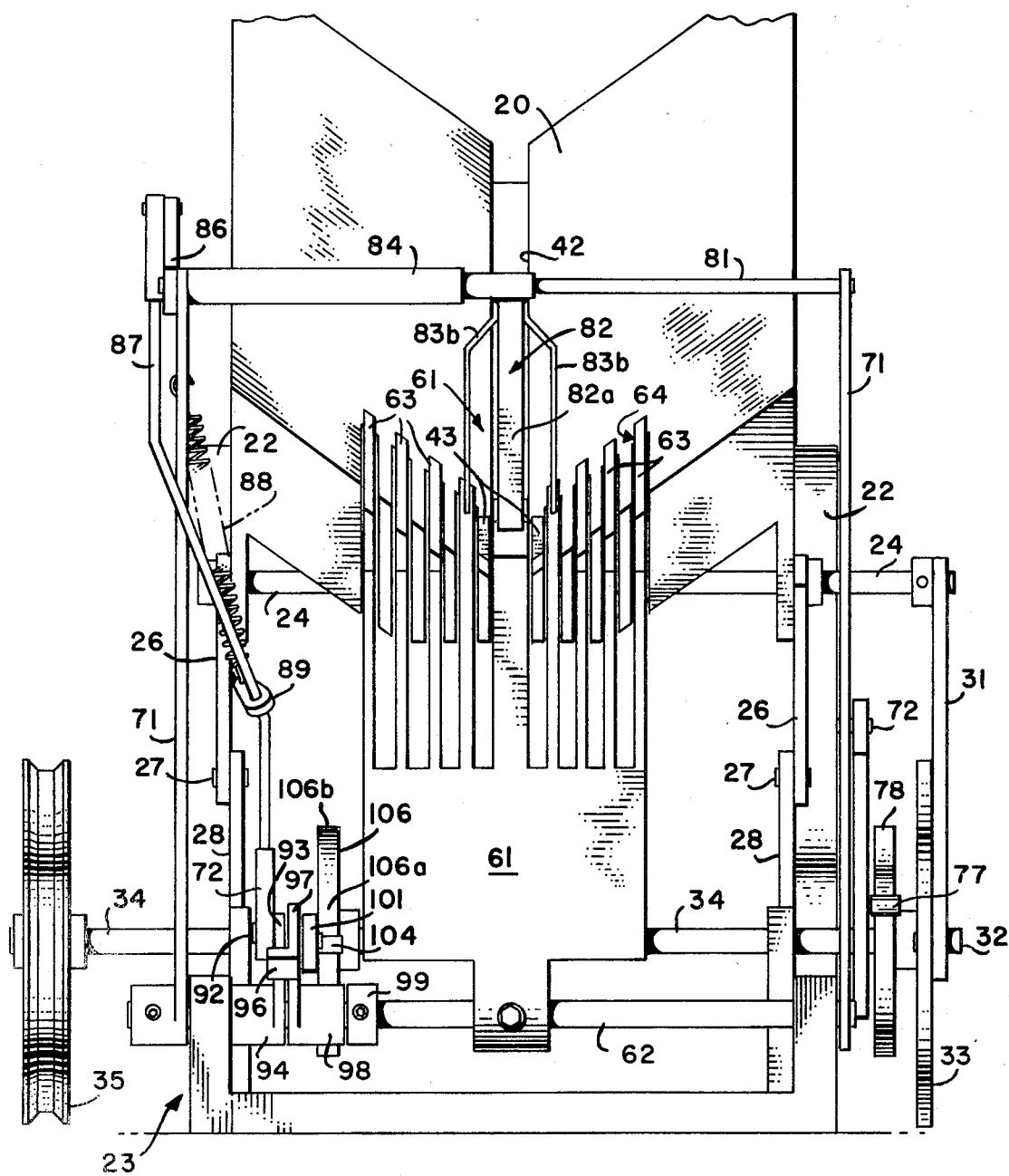
FIG. 4 is an end elevational view of the article feeder taken as indicated by the line 4—4 in FIG. 3.

The discharge end of the trough 20 (FIG. 2) is provided with a series of longitudinally extending slots 41 and a wider central slot 42 at either side of which there is an inclined stop 43. The upper surfaces of the stops 43 are inclined inwardly and downwardly to provide a V-shaped centering construction at the discharge end of the trough. The pocket means of the instant invention comprises an inner pocket member 61 (FIGS. 1–4), which is the closest one of the two pocket members to the trough, mounted in fixed relation on a transverse operating shaft 62. The upper end of the shaft 62 is provided with a series of upright pocket elements 63 of increasing length outwardly from the center and separated by slots 64 to provide a V-shaped upper surface of the pocket. Also, the top edges of the elements 63 are slanted downwardly and inwardly. The elements 63 are complementarily spaced with respect to the slots 41 at the end of the trough so as to be engaged in these slots in telescoped relation with the trough. Centrally of the pocket member 61 there is provided a stripping element 66 which, as seen in FIG. 3, projects to the right of the pocket elements 63 and has its upper surface tapered downwardly and outwardly, i.e., to the left in FIG. 7 so as to provide a feeding action on any group engaged thereby. This element 66 is cooperatively related to the central slot 42 of the trough so as to enable a telescoped relation therewith.

A pair of arms 71 (FIGS. 1–4) are secured on the transverse shaft 62 and the arm nearest in FIG. 3 is pivotally connected to an operating link 73, and this operating link is slotted at 74 to engage over the shaft 34 to support the rearward end thereof, and the link 73 is spring-urged to the right as shown by spring 76, to place its operating roller 77 in engagement with an operating cam 78. This cam 78 is constructed with a link moving portion 78a for the link 73 and with an outer holding portion 78b where the link 73 and the arm 71 are held in their furthest positions to the left as shown in FIG. 3, and to the right as shown in FIG. 1.

The upper ends of the arms 71 (FIGS. 1–4) carry a transverse support rod 81 for the outer pocket member 82, which is carried in depending relation by a sleeve 84 pivoted on the transverse rod 81. This outer pocket member comprises a central member 82a and two outer members 83b which are aligned with the two innermost elements 63 and with the stripping element 66 of the inner pocket member and are correspondingly aligned with the corresponding slots of the trough so as to also be received in telescoped relation with respect to the trough.

The movement of the outer pocket member 82 (FIGS. 1 and 4) into and out of closed relation with the inner pocket member of the pocket means is controlled by an arm 86 secured to the sleeve 84 and pivotally connected at its outer end to an operating link 87. This link 87 is spring-urged upwardly by a spring 88 secured between a bracket 89 on the rod 87 and a spring pin 91 on the adjacent arm 71. At its lower end the link 87 is pivotally connected at 92 to an operating segment 93 carried by a sleeve 94 freely pivoted on the cross shaft 62. It will be seen, therefor, that the spring 88 biases the pocket member 82 to its outermost or open position.

The operating segment 93 (FIGS. 1 and 4) for the outer pocket member is moved between its open and closed positions by virtue of its overlapping relation with an ear 96 of an arm 97 carried by a hub 98 pivoted on the shaft 62 adjacent a retaining collar 99 secured to the shaft. The arm 97 is pivotally connected by a suitable pivot pin (not numbered), with an operating link 101 which extends rearwardly and it is provided with a slotted portion 102 (FIG. 1) to engage over the main shaft 34. This link 102 is spring-urged rearwardly by a spring 103 to urge its cam follower roller 104 against a cam 106 also carried by the operating shaft and constructed similarly to the cam 78 to provide an operating portion 106a and a dwell portion 106b. Dwell portion 106b serves to hold the pocket in closed position during approximately 180° of the travel of the cam 106 and the pocket is allowed to open under the influence of the spring 88 and then brought to closed position in the remaining portion of the travel of the cam. This opening is timed to occur with the pocket in its outboard position, as seen, for example, in FIG. 5.

Figure 5:
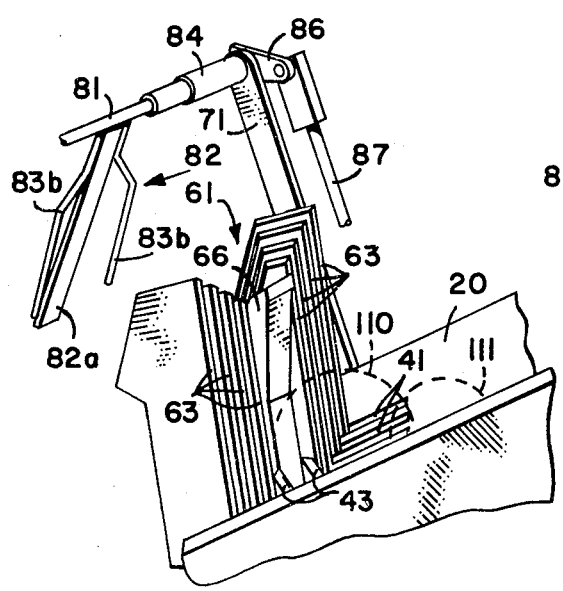
FIG. 5 is a perspective view of the discharge end of the trough taken looking slightly down and from a side into the trough and showing the trough in its lowermost position and the pocket means open.
Figure 6:
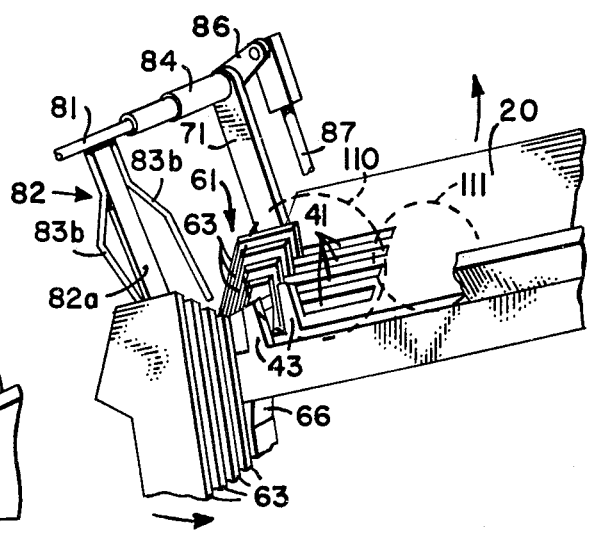
FIG. 6 is a view similar to FIG. 5, but showing the parts in a different adjusted position in which the trough is starting to lift from the position shown in FIG. 6, and in which the pocket means has been moved to a closed position and has begun its telescoping engagement with the end of the trough.

In operation, referring first to FIG. 5, the trough 20 is shown near its lowermost position with the pocket members 61 and 82 in open position, and with two adjacent articles 110 and 111 of different size supported in the trough, the article 110 being against the stops 43 but free of the adjacent face of the stripper element 66. Starting from this position as the trough 20 rises as shown in FIG. 6, the outer pocket member 82 has moved toward closed position and the entire pocket assembly comprises the outer member 82 and the inner member 61 has started to move into telescoped relation with the trough.

Figure 7:
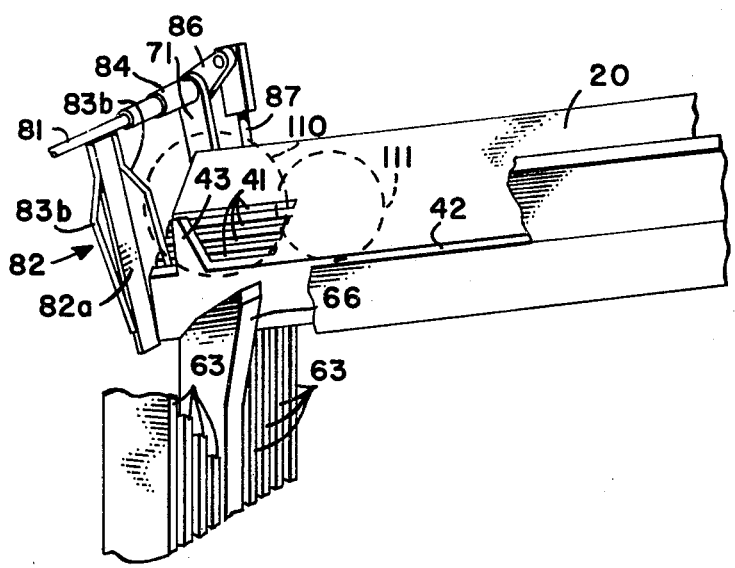
FIG. 7 is a view similar to FIGS. 5 and 6 but showing a further developed relation of the position of the parts during operation in which the trough is fully lifted, and the pocket in fully closed position has been moved into telescoped relation thereof with the trough.

In FIG. 7, the trough 20 is in its topmost position and the pocket member 82–63–66 has moved into its full telescoped relation with respect to the trough. The pocket means is disposed below the endmost member 110 ready to strip it from the trough upon relative vertical movement between the trough and the pocket means.

Figure 8:
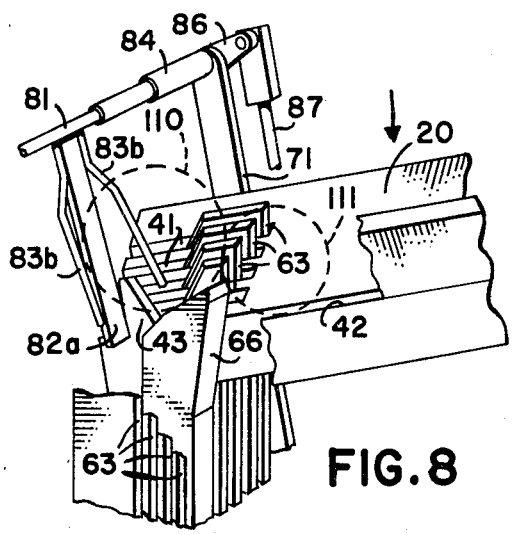
FIG. 8 is a further developed view of the relative position of the pocket and the trough in which the trough has started its downward movement with respect to the pocket and in which the pocket has engaged the endmost article and is lifting it out of the trough.

It will be noted in FIG. 7 that the sharp end of the stripper element 66 is disposed to the right of the center of gravity of the fruit 110, and as seen in FIG. 8 as lowering movement of the trough 20 begins, the stripper element 66 places its sharp end between its two adjacent fruits 110 and 111 so that it will strip the endmost fruit 110 from the trough and temporarily restrain the adjacent fruit 111 from movement along the trough.

Figure 9:
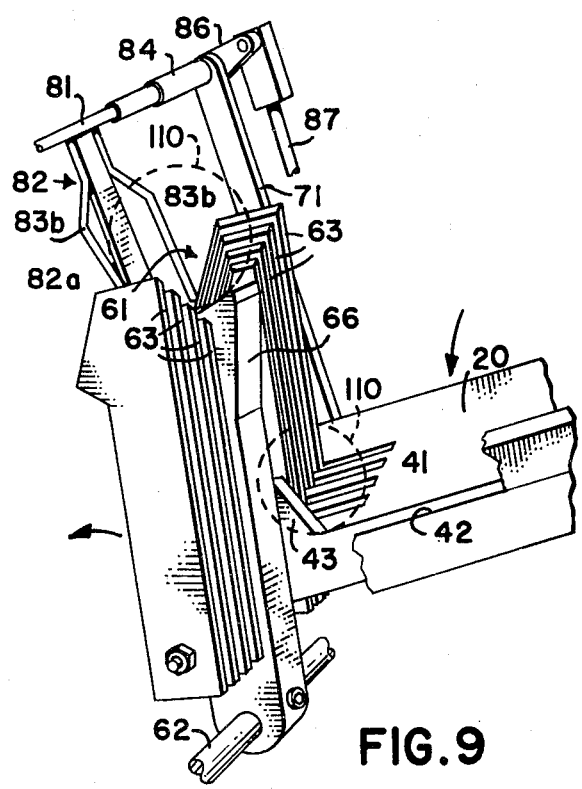
FIG. 9 is a view similar to FIGS. 5-8, in which the removal of the article bodily from the trough has been effected by the pocket and the pocket has moved to an outboard position in overlying relation with respect to the orienter.
Figure 11:
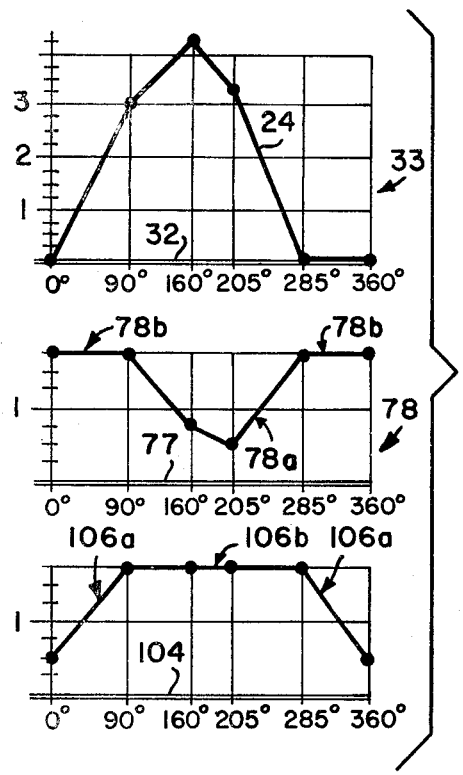
FIG. 11 is a timing chart of the operating means for the trough, the pocket means, and the opening of the pocket.
Figure 10:
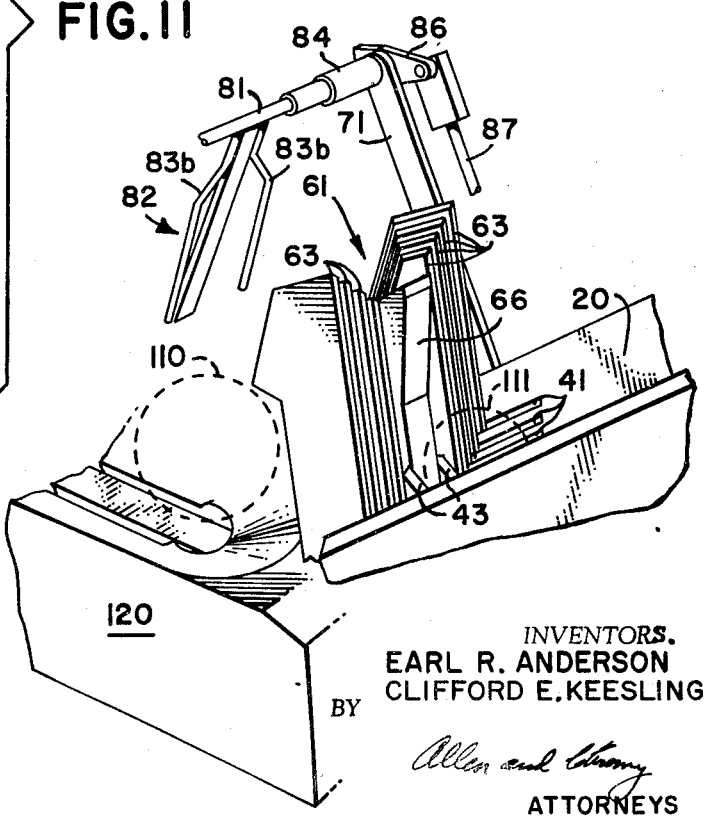
FIG. 10 shows the same relative position of the parts as shown in FIG. 5, and shows an article being released by the pocket thereof for delivery into the orienting mechanism.

Immediately after this operation occurs, the trough 20 rapidly descends to the position shown in FIG. 9 and the pocket means 61 and 82 swing outwardly still in closed position and retain the fruit 110 therein. During downward movement of the trough 20 from the position shown in FIG. 8 to the position shown in FIGS. 9 and 10 the line of abutting of fruit in the trough 20 will move toward the discharge end of the trough to place the article 111 in engagement with the stop 43. This pick up and transfer cycle of movement is completed as shown in FIG. 10 (and also in FIG. 5) when the outer pocket member 82 has swung to the left and allowed the fruit 110 to roll off the inclined surfaces of the inner pocket member 61. The member 110 will be received in an orienting mechanism 120 of the character disclosed and claimed in the copending appleciation of Earl R. Anderson, Ser. No. 602,759, filed Dec. 20, 1966 for Apparatus and Method for Orienting Pears and the Like. As seen in FIG. 10 the orienting mechanism 120 includes an upwardly concave frusto-conical end surface 121 at the end of a trough 122, and the open-bottom of the trough has included therein a conveying and orienting element 123 for the fruit. The frusto-conical surface 121, which merges smoothly with the trough walls 122, is of a smooth character so that a pear deposited on the orienting trough can have its stem end swing around during the rolling movement of the fruit and be deposited without the stem being caught by any rough places or notches in the end wall.

While we have shown and described a preferred form of the invention, and certain preferred methods of carrying out the invention, it is apparent that the invention is capable of variation and modification from the form shown so that the scope thereof should be limited only by the proper scope of the claims appended hereto.

We claim:

1. An article by article feeder for handling field run of fruit or vegetable articles as an abutting file, a movably mounted trough having inclined side walls for carrying an abutting file of articles, said trough having a stop at the discharge end thereof for the endmost article in the abutting file of articles, and a stripping means mounted for movement relative to said trough, said trough and said stripping means having complementary shapes to allow overlapping or telescoping relation therebetween and to provide for discharging of an article from said trough under control of said stripping means, and said stripping means having a position below said trough, and means for relatively moving said stripping means and said trough to remove an article from said trough.

2. An article by article feeder as recited in claim 1, in which said stripping means form part of an article pocket means.

3. An article by article feeder for an abutting file as recited in claim 1, in which said trough has a relatively lower position for feeding of articles therealong to place one of the articles in endmost position in said trough at the discharge end, and said trough has a relatively higher position for removal of said endmost article, and means for operating said trough and said stripping means in timed relation whereby said stripping means moves below said trough while said trough is in said relatively higher position and said trough then lowers to separate the endmost article from the abutting file and to deposit the endmost article on said stripping means.

4. An article by article feeder as recited in claim 1, in which said trough has a slotted construction at the discharge end thereof and said pocket means is also of slotted construction for telescoping engagement with the discharge end of said trough to place said pocket means in overlapping relation with the endmost article in engagement with said stop.

5. An article by article feeder as recited in claim 2, in which said trough and said pocket means are mounted for relative movement into and out of telescoped relation with respect to each other and for relative movement while in said telescoped relation to effect transfer of the endmost article from said trough to said pocket means.

6. An article by article feeder as recited in claim 1, in which mounting means is provided for holding said trough in an inclined position with its discharge end lower than its feed end and in which means are provided for effecting a timed vertical reciprocation of said discharge end of said trough including means for effecting a dwell of said trough adjacent its uppermost position.

7. An article by article feeder as recited in claim 2, in which said pocket means comprises an inner pocket and stripping member for movement into and out of overlapping relation with said trough, and said member includes a stripping element for positioning in lifting relation with respect to the said endmost article and having an upper end for positioning to enter between said endmost article and the next article in abutment therewith.

8. An article by article feeder as recited in claim 2, in which said pocket means comprises inner and outer pocket members mounted for relative opening and closing movement with respect to each other, and means for operating said pocket members to remove an article from the discharge end of said trough and to lift and hold said article suspended in an outboard position with respect to said trough for discharge.

9. An article by article feeder as recited in claim 8, in which means is provided for effecting relative vertical movement between said trough and said pocket means to provide a lower position of the discharge end of said trough for effecting feed of the articles downwardly against said stop and for providing a higher position of said discharge end of said trough with respect to said pocket means in which said pocket means can engage underneath the endmost article in said trough.

10. An article by article feeder and orienter for handling a field run of fruit articles such as pears, a trough for carrying an abutting file of articles, said trough having a stop at the discharge end thereof for the endmost article of an abutting file of articles, pocket means for engaging and lifting the endmost article from engagement with said stop and said trough, and operating means for said pocket means and said trough to effect engagement of said pocket means with said endmost article and for carrying said endmost article to an outboard position with respect to said trough, means for opening said pocket means for discharge of said article while in said outboard position, and an orienter for receiving articles from said pocket in said outboard position and including a second trough having a closed feed end defined by an upwardly facing sloping article receiving surface and also including an open bottom, and an article conveying element disposed in said open bottom for effecting end-over-end movement of a pear having its stem end disposed uppermost in said inclined trough and operating to convey both pears with their stem ends uppermost and with their bulb ends uppermost.

References Cited

UNITED STATES PATENTS

| | | | |
|---|---|---|---|
| 1,942,538 | 1/1934 | Cutler | 198—219 X |
| 2,889,911 | 6/1959 | Keesling | 198—26 |

HUGO O. SCHULZ, Primary Examiner

U.S. Cl. X.R.

198—33, 219; 221—289